United States Patent Office 3,202,696
Patented Aug. 24, 1965

3,202,696
CYCLOBUTANE-1,2-DICHLORO-1,2-DICYANIDE
Janice L. Greene, Warrensville Heights, and James D. Idol, Jr., and Norman W. Standish, Shaker Heights, Ohio, assignors to The Standard Oil Company, Cleveland, Ohio, a corporation of Ohio
No Drawing. Filed Mar. 25, 1963, Ser. No. 267,809
3 Claims. (Cl. 260—464)

This invention relates to a novel chlorinated dicyanide, more particularly to cyclobutane-1,2-dichloro-1,2-dicyanide. The new compound is made from cyclobutane-1,2-dicyanide.

Either the cis or trans forms of the cyclobutane-1,2-dicyanide may be used as the starting material to form the corresponding cis or trans chlorinated dicyanide. The trans cyclobutane-1,2-dicyanide is the more readily available starting material and this form will be described in the preferred embodiment hereinafter. With either form as the starting material, there may be some tendency for isomerization from one form to the other and the final product may be a mixture irrespective of the starting material.

The compound of the invention has the following formula:

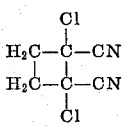

The new compound is prepared according to the following reaction:

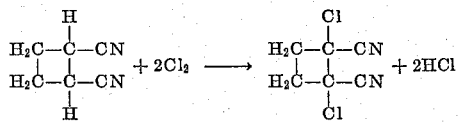

Preferably, the reaction is carried out in a solvent. The reaction can be carried out in the presence of light but this is not necessary. While hydrogen chloride is given off during the reaction, as will be seen from the above equation, and will saturate any solvent employed during the course of the reaction, it is preferred, if a solvent is used, to have the solution saturated with hydrogen chloride at the beginning of the reaction. This increases yields apparently due to a catalytic effect.

Any inert solvent may be used, i.e., a solvent that does not react with the reaction components or the reaction products or one which independently becomes chlorinated during the reaction so as to be otherwise inert. A chlorinated hydrocarbon, a partly chlorinated hydrocarbon, or a hydrocarbon which becomes chlorinated to yield a chlorinated inert solvent during the reaction may be employed. Carbon tetrachloride is preferred. Other solvents which can be used include tetrachlorethylene and trichloroethylene.

The relative proportions of the dicyanide and solvent, if one is employed, are not critical but it is preferred that the cyclobutane-1,2-dicyanide be sufficiently large in relation to the solvent to maintain a single phase during the reaction mixture. The cyclobutane-1,2-dicyanide appears to dissolve some solvents. For instance, carbon tetrachloride is dissolved because at a concentration of 11% by weight of the dicyanide in carbon tetrachloride two phases are formed, whereas a single phase is produced when the dimer is present in a concentration of about 55% by weight at reaction temperature. Since the reaction takes place at a slower rate when two phases are present, a concentration of at least 55% by weight of dicyanide in the solvent is preferred and an optimum of the dicyanide in carbon tetrachloride is about 60 to 80% by weight.

The reaction temperature may be from ambient temperature up to those at which dehydrochlorination occurs, i.e., under 200° C. and preferably from 60 to 175° C. If the reaction is carried out under reflux conditions the boiling points of the various materials in the reaction mixture can be utilized as a means of controlling the temperature. The reaction is exothermic and the rate of chlorine addition as well as external cooling can be used to control the temperature. The lower temperature limit is the boiling point of the solvent when reaction is carried out under reflux and when the solvent is carbon tetrachloride this temperature is 77° C. However, the reflux temperature increases as the concentration of the dicyanide in the reaction mixture increases.

The reaction time is a function of temperature and yield desired. Generally long reaction times are required to assure optimum yields.

The following example will illustrate the best mode contemplated for preparing the new compound.

*Example I*

One hundred (100) grams of trans cyclobutane-1,2-dicyanide and fifty (50) grams of dry carbon tetrachloride were placed in a dry 250 ml. three-necked flask equipped with a thermometer, a gas bubbler, and a reflux condenser topped with a drying tube. Dry hydrogen chloride was bubbled in for four hours to saturate the solution. The dry hydrogen chloride feed was discontinued and dry chlorine was bubbled into the reaction mixture at room temperature while the flask was irradiated with ultraviolet light. The reaction mixture was gradually heated and as the reaction proceeded the temperature rose to a maximum of 172° C. during the course of seven hours. When the development of heat ceased, indicating that the reaction was complete, the carbon tetrachloride was evaporated from the reaction mixture and the residue fractionated by vacuum distillation. A yield of 71 grams of product equivalent to a 52% yield was obtained.

When the reaction temperature was maintained within the range of 30 to 82° C. during a period of twenty-four hours the yield was 77%.

The product in both instances had a melting point of 65.5 to 66.5° C. and a boiling point of 104° C. at a mercury pressure of 6 mm. The boiling point of the starting dicyanide is 122° C. at the same pressure. The new compound has the following analysis:

| Percent | Theoretical, Percent | Found, Percent |
|---|---|---|
| Carbon | 41.15 | 41.76 |
| Hydrogen | 2.28 | 2.98 |
| Nitrogen | 16.00 | 15.88 |
| Chlorine | 40.55 | 40.15 |

The structure was additionally confirmed by infra-red analysis and by nuclear magnetic resonance.

The product is useful as a nematocide and can be applied to a nematode containing soil in any of the usual manners such as in a solvent or mixed with a solid carrier such as clay, or as an ingredient of a fertilizer. The presence of both the cyanide and the chloride group on adjacent carbon atoms makes the compound particularly effective for this purpose. It may be applied at the rate of 40 to 160 pounds per acre in accordance with any of the well-known techniques for applying solid nematocides.

We claim:
1. A compound having the formula:

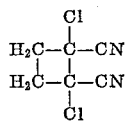

2. A process for preparing the compound having the formula

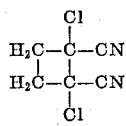

which comprises chlorinating one mole of cyclobutane-1,2-dicyanide with two moles of molecular chlorine in an inert solvent in the presence of added hydrogen chloride at a temperature ranging from ambient temperature up to 200° C.

3. A process for preparing the compound having the formula

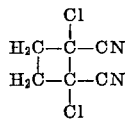

which comprises chlorinating one mole of cyclobutane-1,2-dicyanide with two moles of molecular chlorine in carbon tetrachloride in the presence of added hydrogen chloride at a temperature of from 60 to 175° C.

References Cited by the Examiner

Groggins, "Unit Processes in Organic Synthesis," third edition, 1947, page 169.
Knapsack, C. A., 55, 1961, page 13338i.
Lustig, J. Chem. Physics, vol. 37, Dec. 1, 1962, pp. 2725–2726.

CHARLES B. PARKER, *Primary Examiner.*